(12) United States Patent
Chen

(10) Patent No.: US 7,800,536 B2
(45) Date of Patent: Sep. 21, 2010

(54) SIGNAL ACQUISITION/TRACKING METHOD AND CORRELATOR FOR THE SAME

(75) Inventor: Kun-tso Chen, Fang-Yuan Hsiang (TW)

(73) Assignee: MEDIATEK, Inc., Hsin-Chu (TW)

( * ) Notice: Subject to any disclaimer, the term of this patent is extended or adjusted under 35 U.S.C. 154(b) by 323 days.

(21) Appl. No.: 11/870,604

(22) Filed: Oct. 11, 2007

(65) Prior Publication Data

US 2009/0096668 A1 Apr. 16, 2009

(51) Int. Cl.
*G01S 19/30* (2010.01)
*G01S 19/38* (2010.01)
*H04B 7/185* (2006.01)

(52) U.S. Cl. .......................... 342/357.78; 342/357.68; 342/358

(58) Field of Classification Search ............ 342/357.12, 342/357.68, 357.78, 358
See application file for complete search history.

(56) References Cited

U.S. PATENT DOCUMENTS

| 6,272,174 B1 | 8/2001 | Murphy |
| 6,952,440 B1 | 10/2005 | Underbrink |
| 6,959,057 B1 | 10/2005 | Tuohino |
| 6,970,577 B2 | 11/2005 | Han |
| 6,975,673 B1 | 12/2005 | Rouquette |
| 7,006,556 B2 | 2/2006 | Abraham |
| 7,027,486 B2 | 4/2006 | Sullivan |
| 7,027,534 B2 | 4/2006 | Sahai et al. |
| 7,042,930 B2 | 5/2006 | Dafesh |
| 7,046,194 B2 | 5/2006 | Dooley et al. |
| 7,065,629 B2 | 6/2006 | Warloe et al. |
| 7,099,378 B2 | 8/2006 | Dunyak et al. |
| 7,110,782 B2 | 9/2006 | Yamaguchi |
| 2002/0110184 A1* | 8/2002 | Akopian et al. ............. 375/149 |

* cited by examiner

*Primary Examiner*—Thomas H Tarcza
*Assistant Examiner*—Harry Liu

(57) ABSTRACT

A Doppler frequency searching method and correlator are disclosed. In the present invention, before Doppler frequency removal, a received signal is converted into digital form and the spreading code is removed. Then the signal is downsampled to have a low sampling rate, which can be determined according to the maximum Doppler frequency to be searched. The Doppler frequency searching is done by stages. Each stage is in charge of a portion of the Doppler frequency to be removed. The sampling rate can be further reduced in each stage. Each stage can have a plurality of Doppler frequency removal units sharing the portion of Doppler frequency that the stage is to remove. Power consumption is reduced since Doppler frequency removal is executed with low sampling rate.

24 Claims, 8 Drawing Sheets

SIGNAL ACQUISITION/TRACKING METHOD AND CORRELATOR FOR THE SAME

TECHNICAL FIELD OF THE INVENTION

The present invention relates to GNSS signal acquisition/tracking, more particularly, to a Doppler frequency searching method in the GNSS receiver and a correlator implementing the method.

BACKGROUND OF THE INVENTION

In signal acquisition of a GNSS system (Global Navigation Satellite System; such as GPS, GLONASS, GALILEO and the like), there are three searching dimensions: visible satellite ID, Doppler frequency, and code phase. One combination of a specific satellite ID, a specific Doppler frequency, and a specific code phase is referred to a "hypothesis": For a specific satellite, there are totally M×N hypotheses to be tried if there are M possible Doppler frequencies and N code phases. For a GPS (Global Positioning System) signal, the chipping rate of pseudo-random code is 1.023 MHz. That is, there are 1023 chips in one millisecond. If the chip spacing in the code phase dimension is taken as ½ chip, there will be 1023× 2=2046 bins in code phase dimension for a C/A code receiver. In general, it is difficult to decrease the number of the bins or equivalently the search range of code phase to be searched if there is no prior precise information about timing, satellite and user position.

As mentioned, for the specific satellite, there is still Doppler frequency to be searched in signal acquisition. The satellite movement with respect to a user causes the real Doppler frequency shift. For a stationary user, the maximum Doppler frequency shift is about ±5 kHz, for example. Therefore the search range is 10 kHz. However, other factors may also enlarge the search range in addition to the real Doppler frequency shift. For example, the carrier frequency of the received IF signal might be biased by the local clock. A GNSS receiver uses a TCXO (Temperature Compensated Crystal Oscillator) or other kinds of oscillators to provide a precise local clock signal but with an unknown bias and specified drift range. Such a clock bias and drift will affect the carrier frequency of the GNSS baseband signal and result in an effective Doppler frequency shift.

Another factor resulting in more Doppler frequency search bins is the long coherent integration time used in the acquisition. Long coherent integration time is usually required for weak signal acquisition to improve SNR and thus detection probability. Long coherent integration time can improve the efficiency of signal detection with a trade-off of more Doppler frequency bins to be searched. As the coherent integration time is extended, the allowable Doppler frequency error is reduced. For example, the allowable Doppler frequency error is less than 1 kHz for a coherent integration time of 1 ms, while less than 50 Hz Doppler frequency error is allowable for a coherent integration time of 20 ms. In an AGPS (Assisted GPS or Aided GPS) system, where very long coherent integration time such as two seconds or more may be used after the aiding of the known data bit sequence, the number of Doppler frequency search bins is increased greatly even the search range is the same or reduced. As discussed above, there are various factors that influence the Doppler frequency search range and number of search bins. Accordingly, it is possible that the number of Doppler frequency search bins changes dynamically under different situations. Hence, we need a flexible Doppler search correlator.

It is important to search Doppler frequencies of all the satellites as fast as possible to reduce TTFF (Time To First Fix), which is a main performance metric of the satellite communication receiver. Moreover, the acquired Doppler frequencies of the first few satellites can be used to adjust and reduce the Doppler frequency search range of the remaining satellites. Then, the same number of correlators can be used to search the reduced Doppler frequency range with longer coherent integration time used to enhance acquisition performance.

Operation complexity of Doppler frequency search will be increased when the Doppler frequency search range is wide, or the Doppler frequency search bin is narrow. That is, the more Doppler frequency bins are to be searched, the more complicated the operation is. The operation complexity for Doppler frequency search requires large memory size and high power consumption.

FIG. 1 shows a typical correlator of a GNSS receiver. A satellite signal is received and amplified. Then it is down-converted to IF (Intermediate Frequency) stage. At this stage, the received signal is in analog form. Then, the received signal is converted into digital form by an ADC (analog-to-digital converter) 108. The digital signal from the ADC 108 is down converted by means of a carrier NCO 112 (Numerically Controlled Oscillator), phase shifters 114, 116 and mixers 121, 122. The mixed result is a complex signal with in-phase and quadrature components. The in-phase and quadrature components are subjected to multiplication in multipliers 141~146 with reference PRN code generated by an E/P/L (Early/Prompt/Late) PRN code generator 120. The E/P/L PRN code generator 120 is controlled by a code NCO 123. The multiplication values are respectively accumulated by the accumulators 131~136 to generate the correlation results IE, IP, IL and QE, QP, QL. The integrated signals are led to a receiver processor 110. The receiver processor 110 processes these values. One correlator is required to search one Doppler frequency bin.

FIG. 2 schematically and generally shows another correlator structure with post correlation FFT. A signal received by an antenna 201 is down-converted to IF stage and sampled from analog to digital domain by a RF receiver 203. The Doppler and IF center frequency of the IF signal are then removed by the carrier removal unit 205. The complex signal components, in-phase and quadrature, are then processed by code despreading unit 207 and coherently integrated by IAD (Integration And Dump) unit 209. The coherent integration results of the I and Q components are accumulated in a buffer 211. The coherent integration time of IAD 209 is adjustable from 1 to 5 ms and 1 ms is usually used, for example. When several I and Q 1 ms-integration values are collected in a row, 20 IAD values for example are passed to an FFT (Fast Fourier Transfer) engine 213 to perform frequency domain analysis. Twenty Doppler frequency bins can be searched at the same time by checking the FFT output values, which can be integrated coherently or incoherently over several 20 ms by using a coherent sample RAM 215, an incoherent sample RAM 221, a magnitude computation unit 217 and an IAD unit 219. In this structure, the additional data buffer unit 211 is required to store the correlations samples (i.e. integration results) before Doppler frequency searches (i.e. FFT operation). The buffer size will be very large if a parallel correlator bank is used to search wide ranges of satellite, code and Doppler dimensions at the same time. Large memory size of the buffer introduces high cost and much power consumption due to the operations of writing and reading the data buffer. In addition to the problem of high power consumption, the post correlation FFT correlator structure has a disadvantage that the parallel Doppler frequency hypotheses are fixed. That is, such a correlator can only compute correlations on fixed discrete frequencies. The interval between the Doppler frequencies to be searched is unchangeable. Therefore, the Doppler frequency hypotheses are limited and inflexible.

SUMMARY OF THE INVENTION

In accordance with an aspect of the present invention, a method for searching Doppler frequency in a GNSS receiver comprises steps of converting a received signal into a digital signal having a first sampling rate; executing code removal to the digital signal to generate a code-removed signal; down-sampling the code-removed signal to output a down-sampled signal having a second sampling rate; and searching Doppler frequency bins for the down-sampled signal.

In accordance with another aspect of the present invention, Doppler frequency bins are searched in a plurality of stages. Doppler frequency of the signal is divided into portions to be removed in the respective stages. The sampling rate of the signal is further reduced in each stage. Each stage can have a plurality of branches to share the Doppler frequency portion. At least one branch is deactivated when the Doppler frequency range to be searched is small.

In accordance with a further aspect of the present invention, a correlator comprises an analog-to-digital converter for converting a received signal into a digital signal having a first sampling rate; a code removal unit receiving the digital signal to generate a code-removed signal; a down-sampling unit receiving the signal and outputting a down sampled signal having a second sampling rate; and a Doppler frequency searching device for searching Doppler frequency bins for the down-sampled signal.

In accordance with still a further aspect of the present invention, the Doppler frequency searching device comprises a plurality of stages connected in series. Each stage has at least one Doppler remover for removing a portion of Doppler frequency of the signal by mixing the signal with a carrier. The Doppler frequency remover has an integration-and-dump unit to down-sample an output of the Doppler frequency remover. At least one of the Doppler frequency removers can be deactivated when the Doppler frequency range to be searched is small.

DETAILED DESCRIPTION OF THE INVENTION

The present invention will be described in detail in conjunction with the appending drawings.

Figure 1:
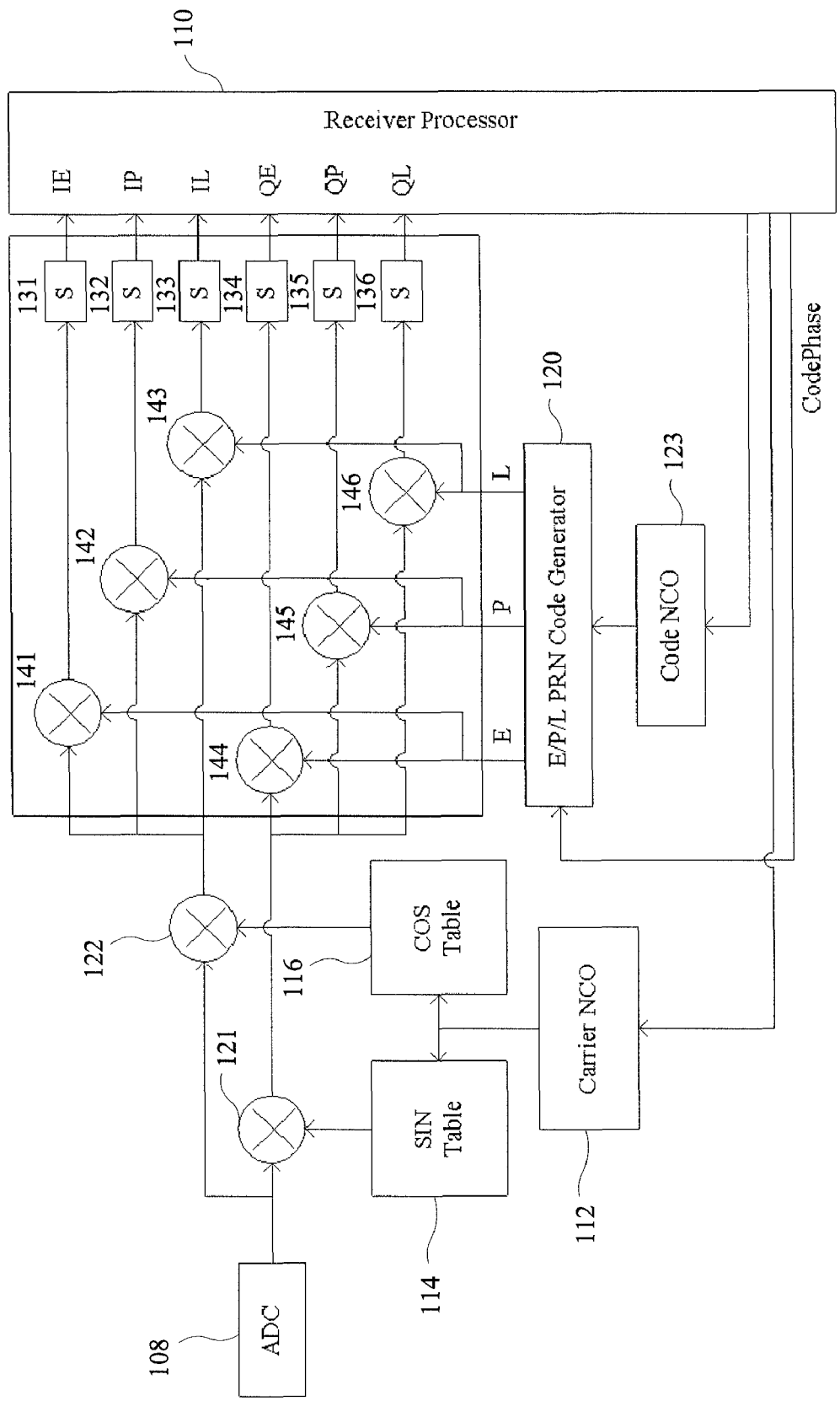
FIG. 1. is a schematic block diagram generally showing a conventional correlator structure.
Figure 2:
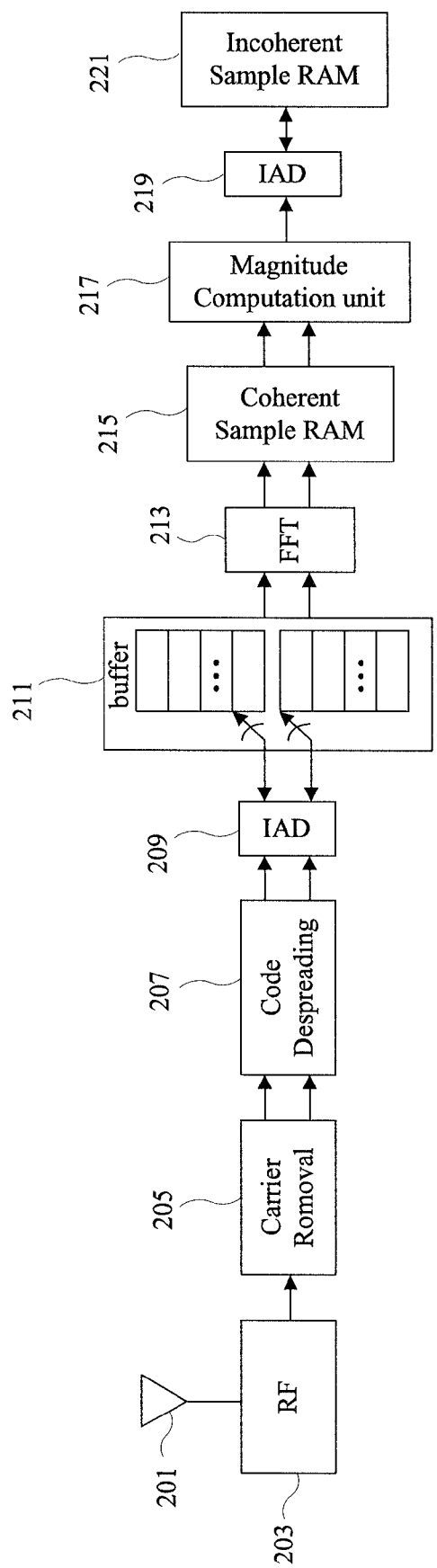
FIG. 2 is a schematic block diagram generally showing a conventional post correlation FFT correlator structure.
Figure 3:
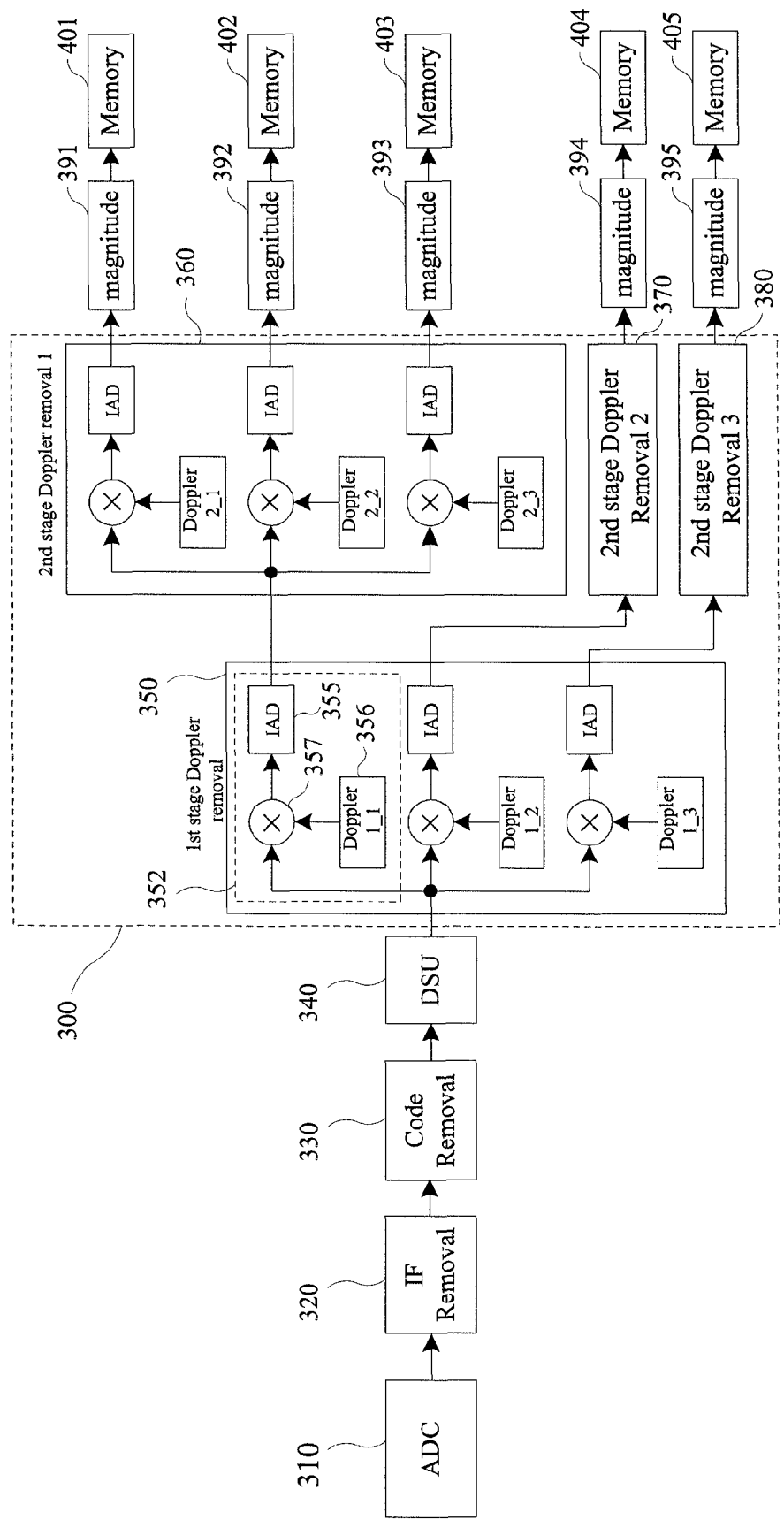
FIG. 3 is a schematic block diagram generally showing a correlator structure in accordance with a first embodiment of the present invention.
Figure 4:
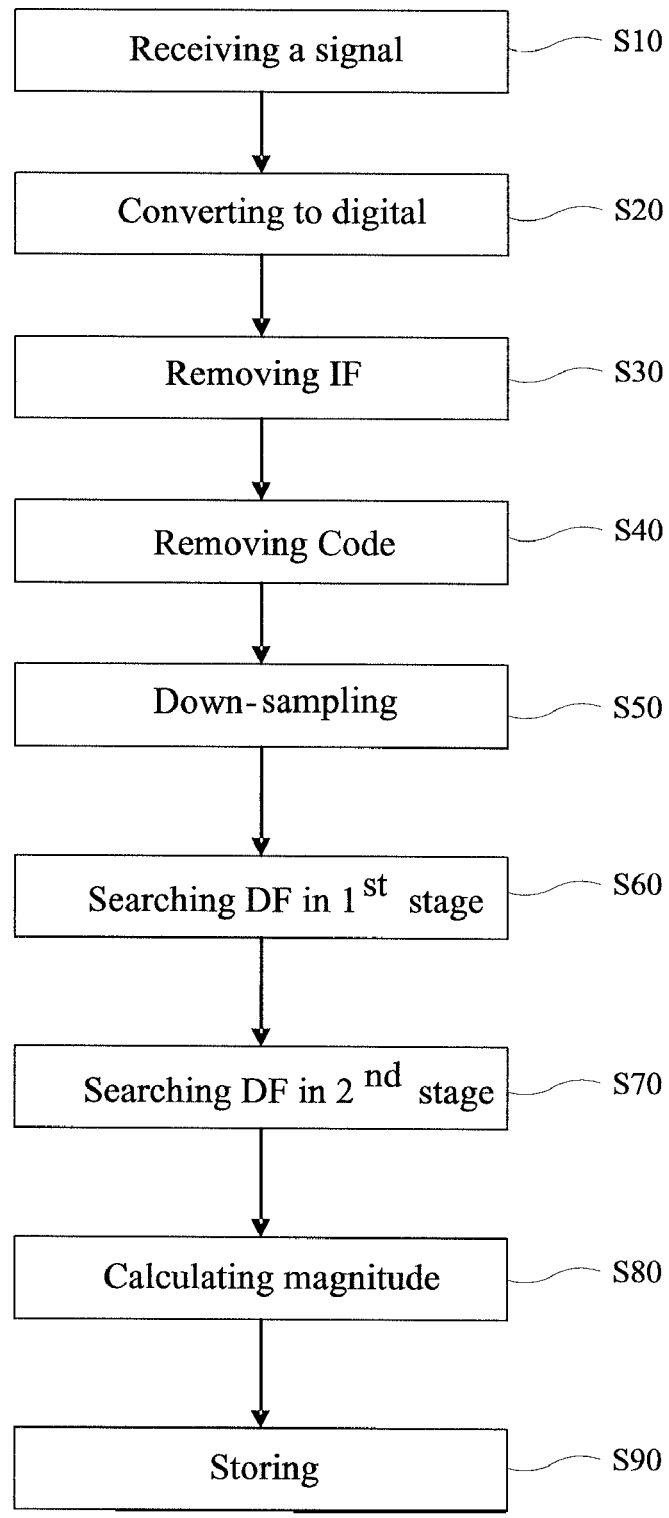
FIG. 4 is a flow chart generally showing a correlation method of the present invention.

FIG. 3 is a schematic block diagram generally showing a correlator structure in accordance with a first embodiment of the present invention. FIG. 4 is a flow chart generally showing a correlation method of the present invention. The present embodiment will be described in conjunction with FIG. 3 and FIG. 4. In this structure, a signal is received (step S10), which has been down-converted to IF band, is converted from analog form to digital from by an analog-to-digital converter (ADC) 310 with a high sampling rate such as 16.368 MHz (step S20). The digital signal from the ADC 310 is then further down-converted to baseband by an IF removal unit (carrier removal unit) 320 (step S30). The IF removal unit 320 can be implemented by a combination of a carrier NCO (not shown), a phase shifter (not shown) and mixers (not shown) as the conventional correlator. The IF (carrier) removed signal is then processed by a code removal unit 330 to wipe-off the code of the signal (step S40 A code-removed signal is outputted after the code removal is executed to the IF (carrier) removed signal by the code removal unit 330). The code removal unit 330 can be implemented by a combination of a code generator (not shown) and mixers (not shown) as the conventional correlator. In accordance with the present invention, the signal having a first sampling rate, of which the IF (carrier) and code have been wipe-off, is passed to a down-sampling unit (DSU) 340, which is implemented by an integration-and-dump (IAD) unit, to be down-sampled to generate a down-sampled signal having a second sampling rate (step S50). In different embodiments, the down-sampling unit 340 can be implemented in different structure just for down-sampling. For example, the down-sampling unit 340 integrates and dumps every four samples of the digital signal. By doing so, the sampling rate of the output signal from the down-sampling unit 340 is reduced to 4.092 MHz. The down-sampling unit 340 performs the down-sampling operation by integrates some samples of the signal and dumps the integration values thereof.

In the present embodiment, the Doppler frequency search range is searched in two stages. That is, a Doppler frequency searching device, which is indicated by a reference number 300 in FIG. 3, has two stages. Each stage comprises one or more Doppler frequency removal unit. In this case, a first stage Doppler frequency removal unit 350 has three Doppler frequency removers 352, each of which includes an IAD unit 355, a Doppler frequency provider 356 and a mixer 357. The Doppler frequency to be removed in the Doppler frequency remover 352 is determined by the carrier provided by the Doppler frequency provider 356. By changing the carrier, the Doppler frequency of the Doppler frequency remover can be adjusted. The IAD unit 355 down-samples the signal to further reduce the sampling rate into 33 kHz, for example. The down-sampling operation of the IAD unit can be adjusted. If a Doppler frequency search range of 6 kHz is to be searched, each of the three Doppler frequency removers 352 in the first stage Doppler frequency removal unit 350 is in charge to a search range of 2 kHz, for example (step S60). However, other distribution is also possible, such as 3 kHz, 2 kHz and 1 kHz. The distribution can be adjusted as required by controlling the Doppler frequency providers 356.

The second stage may also comprise three Doppler frequency removal units 360, 370 and 380. Each Doppler frequency removal unit receives and processes the output from one of the Doppler frequency remover 352 of the first stage Doppler frequency removal unit 350 and executes further Doppler removal operation (step S70). The Doppler frequency removal unit 360, 370 or 380 has the same structure as the Doppler frequency removal unit 350, and therefore the detailed description thereof is omitted herein to avoid redundancy. The search operation of each Doppler frequency removal unit can be considered as a branch. That is, in each stage, the allocated Doppler frequency range can be searched in plural branches. As can be seen, each Doppler frequency removal unit of the second stage can operate at a further lower frequency since the search range to be processed is further narrowed as compared to the first stage. The Doppler frequency-removed signals from the respective Doppler frequency removers of the second stage are then processed to calculate the magnitude thereof by magnitude units 391-395 (step S80), each of which computes the absolute value of the signal, for example, and the calculated magnitudes are stored in memories 401~405, respectively (step S90). The memories 401~405 can be implemented by RAMs, for example.

The usage of the respective Doppler frequency removers of the respective stages can be adjusted as required. For example, in the present embodiment, all of the Doppler frequency removers of the first and second stages are activated in signal acquisition procedure, since many Doppler frequency bins are to be searched in this procedure. However, a few Doppler frequency bins are necessary in signal tracking procedure. Accordingly, the second and third Doppler frequency removers of the Doppler frequency removal unit 350 at the first stage as well as the second Doppler frequency removal unit 370 and the third Doppler frequency removal unit 380 at the second stage can be deactivated in signal tracking procedure. Therefore, the power consumption can be significantly reduced. The Doppler frequency search can be executed more flexibly. In addition, the first stage Doppler frequency removal and the second stage Doppler frequency removal are operated at low frequency due to down-sampling operations of the respective IAD units as described above, the power consumption can be further reduced. When the Doppler frequency search range is large, the sampling rate of a stage (e.g. the first stage) can be speeded up to remove a larger Doppler frequency component of the signal.

Figure 5:
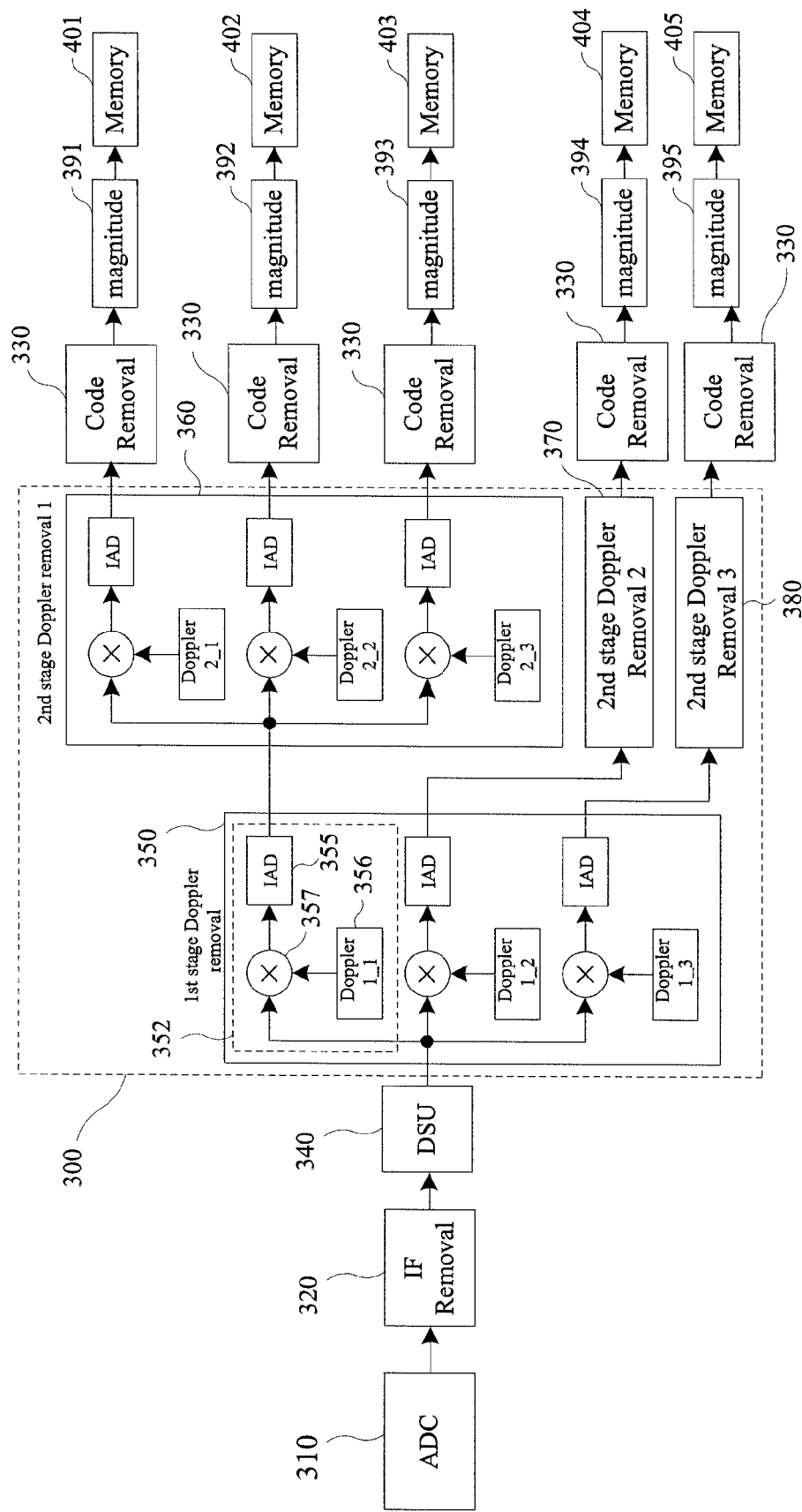
FIG. 5 is a schematic block diagram generally showing a correlator structure in accordance with a second embodiment of the present invention.

It is noted that the IF removal unit 320 is optional. In a case that the IF removal unit is omitted, the IF removal can be combined into the Doppler frequency removal since both removal operations are aimed at frequency domain. Furthermore, The code removal unit 330 may also disposed after the Doppler frequency removal stages, as shown in FIG. 5 showing a correlator in accordance with another embodiment. If so, the sampling rate should be maintained to be sufficiently high so as to support the code dispreading operation of the code removal unit 330.

Figure 6:
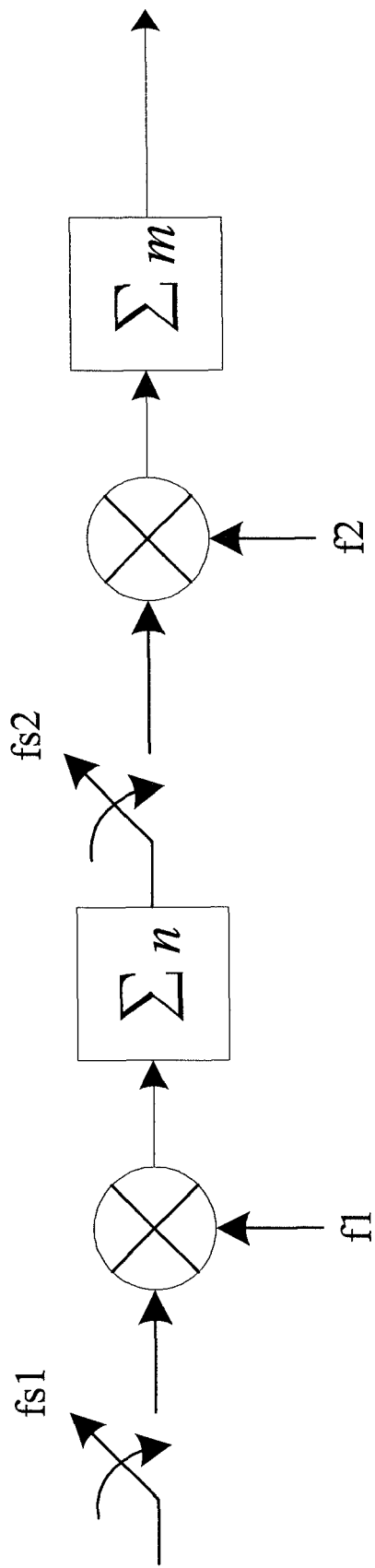
FIG. 6 schematically shows a two-stage Doppler frequency removal scheme.

FIG. 6 schematically shows a two-stage Doppler frequency removal scheme. It is assumed that the Doppler frequency to be tested is f that can be divided into two frequencies f1 and f2. That is, f=f1+f2, wherein f=f1+f2 indicates an arithmetic relationship. At the first stage, a signal is down-sampled to have a sampling rate of fs1. The relationship between f1 and fs1 should satisfy the following inequality:

$$-fs1/2 < f1 < fs1/2 \qquad (1)$$

The down-sampled signal denoted by r[n] with the sampling rate fs1 is mixed with a carrier with a frequency $e^{-j2\pi[f1/fs1]n}$ at the first stage and then be accumulated. The signal is then further down-sampled with a sampling rate of fs2. The relationship between f2 and fs2 should satisfy the following inequality:

$$-fs2/2 < f2 < fs2/2 \qquad (2)$$

The down-sampled signal with the sampling rate fs2 is mixed with a carrier with a frequency $e^{-j2\pi[f2/fs2]m}$ at the second stage and then be accumulated. By using two sampling rate domains, each of which has a low sampling rate, the power consumption can be considerably reduced. It is noted that more stages are also possible. However, each stage requires utilization of IAD unit(s). Each IAD unit comprises a buffer. The more Doppler frequency removal stages are used, the more IAD units are used. As can be seen, if there are too many Doppler frequency removal stages, many buffers will be used in the correlator, which is not desirable.

Figure 7:
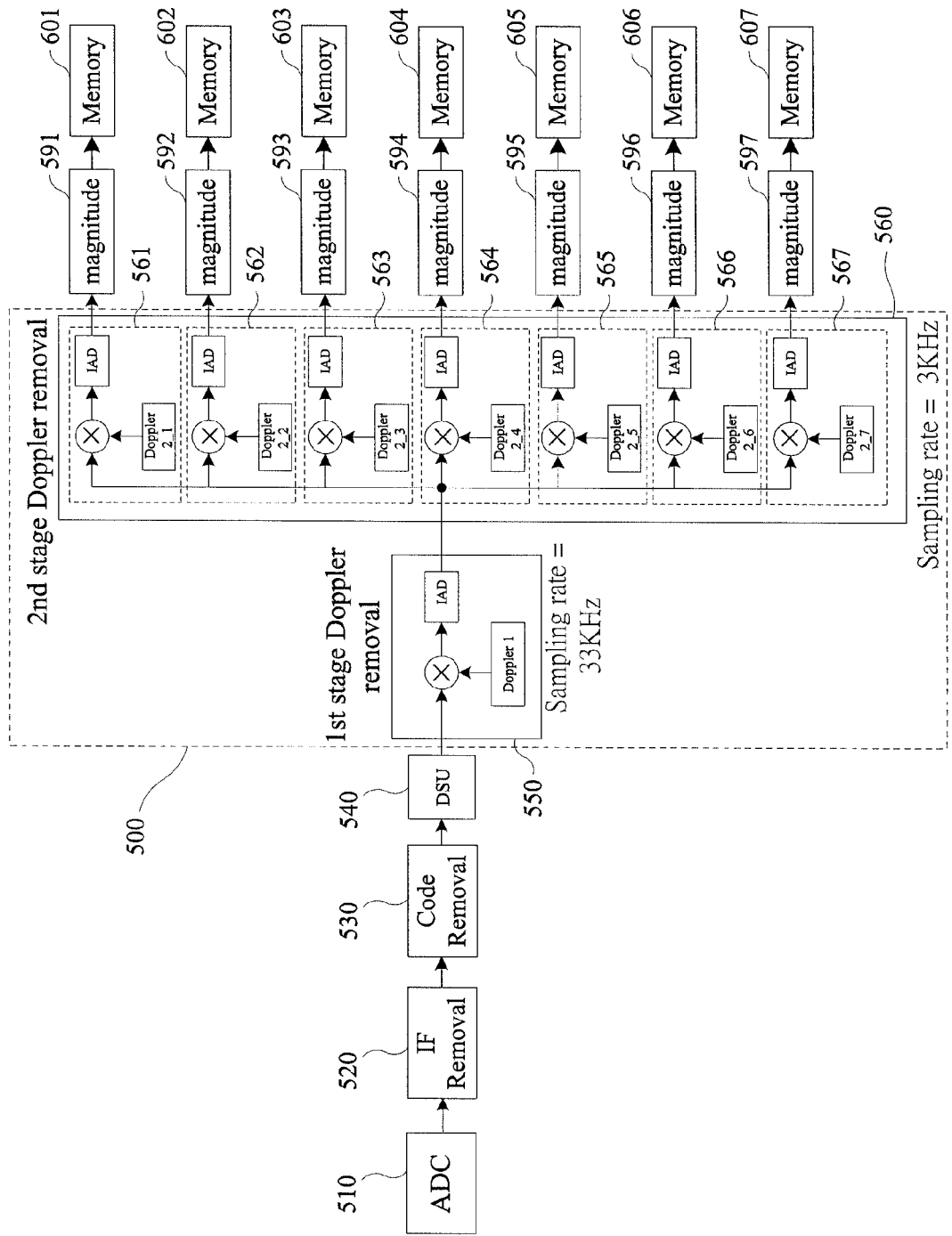
FIG. 7 is a schematic block diagram generally showing a correlator structure in accordance with a third embodiment of the present invention.

FIG. 7 is a schematic block diagram generally showing a correlator structure in accordance with a second embodiment of the present invention. In the present embodiment, seven Doppler frequency bins (seven Doppler frequency hypotheses) are searched at the same time. The numbers of the Doppler frequency removers at the first stage and second stage are different from those in the first embodiment. In the correlator structure of the present embodiment, components such as an ADC 510, an IF removal unit 520, a code removal unit 530, and DSU 540 are the same as those in the first embodiment. Therefore, the descriptions thereof are omitted herein for the sake of avoiding redundancy. a Doppler frequency searching device 500 of the present embodiment also has two Doppler frequency removal stages, each of which comprises one Doppler frequency removal unit. As shown in the drawing, the first stage Doppler frequency removal unit 550 has only one Doppler frequency remover, which is the same as described in the first embodiment, and therefore the detailed description thereof is omitted.

The second Doppler frequency stage comprises a second stage Doppler frequency removal unit 560. The second stage Doppler frequency removal unit 560 has seven Doppler frequency removers 561~567. Each Doppler frequency remover has the same structure as described in the first embodiment, and therefore the description thereof is omitted herein. The Doppler frequency-removed signals from the respective Doppler frequency removers 561~567 of the second stage are then processed to calculate the magnitude thereof by magnitude units 591-597, and the calculated magnitudes are stored in memories 601-607, respective. It is assumed that the sampling rate of the ADC 510 is 16.368 MHz, the IF center frequency is 4.092 MHz and the total Doppler frequency is 2131.25 Hz. The IF removal unit 520 down converts the signal with a carrier of frequency 4.092 MHz. The IAD unit 540 down-samples the signal, which has been IF removed and code removed, to reduce the sampling rate from 16.368 MHz to 33 kHz. That is, the first stage Doppler frequency removal is operated at a low frequency of only 33 kHz. The first stage Doppler frequency removal unit 550 removes Doppler frequency of 2000 Hz by using the sampling rate of 33 kHz.

Figure 8:
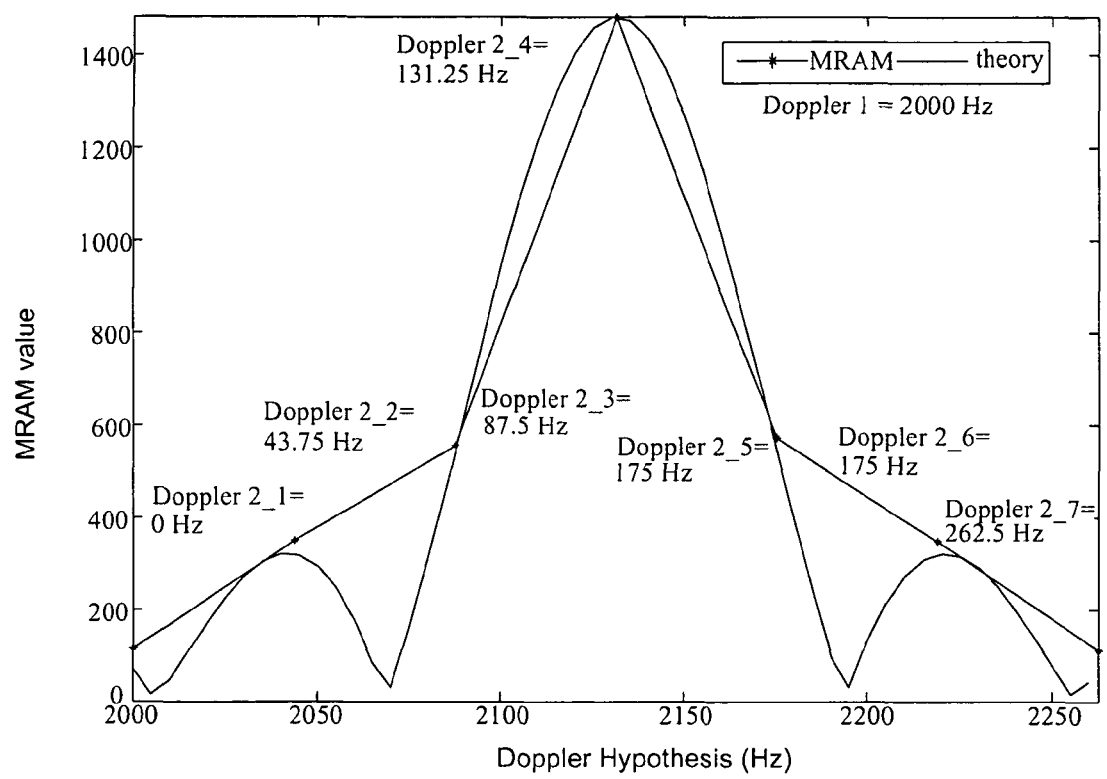
FIG. 8 is a diagram showing numeral results of the third embodiment of the present invention.

At the second stage Doppler frequency removal, the second stage Doppler frequency removal unit 560 operates at a sampling rate of 33 kHz to remove Doppler frequencies of 0, 43.75, 87.5, 131.25, 175, 218.75 and 262.5 Hz, respectively by the Doppler frequency removers 561-567. These Doppler frequencies can be changed by providing different carriers to the Doppler frequency removers. In either the first or the second embodiment, the Doppler frequency removers of the respective stages are connected in a tree structure. In each Doppler frequency remover, the IAD unit is used to coherently combine the despreaded (code-removed) and Doppler frequency removed signal. For example, 16 ms coherent integration time can be used. Each of the memories 601-607 accumulates the magnitude of the IAD result calculated by one of the magnitude units 591-597. That is, the magnitude of 16 ms coherent integration results (which are complex numbers) are accumulated and stored in the memory. The detected Doppler frequency is determined by checking the maximum incoherent integration result stored in the seven memories 601-607. The numeral results of the memories 601-607 are shown in the plot of FIG. 8, which is a diagram showing numeral results of the third embodiment of the present invention. As can be seen from the diagram, the numerical result of our embodiment matches the theoretical result, which uses a direct Doppler removal without multiple stages and down-sampling. As can be seen, the Doppler frequency search range is adjusted to the center uncertainty range at the first stage. The residual Doppler frequency of the output from the first stage becomes very small. Accordingly, the sampling rate used in the following stage can be much slower. By doing so, the power consumption can be significantly reduced.

While the preferred embodiments of the present invention have been illustrated and described in detail, various modifications and alternations can be made by persons skilled in this art. The embodiment of the present invention is therefore described in an illustrative but not restrictive sense. It is intended that the present invention should not be limited to the particular forms as illustrated, and that all modifications and alternations which maintain the spirit and realm of the present invention are within the scope as defined in the appended claims.

What is claimed is:

1. A method for searching Doppler frequency in a GNSS receiver, comprising steps of:
   converting a received signal into a digital signal having a first sampling rate;
   down-sampling the digital signal to output a down-sampled signal having a second sampling rate; and
   searching Doppler frequency bins for the down-sampled signal.

2. The method of claim 1, wherein the down-sampling is executed by integrating a predetermined number of data samples of the signal and dumping the integration results of the data samples into a sample value.

3. The method of claim 1, wherein the Doppler frequency bins are searched in a plurality of stages, Doppler frequency of the signal is divided into portions to be removed in the respective stages.

4. The method of claim 3, wherein sampling rate of the signal is further reduced in each stage.

5. The method of claim 3, wherein each stage comprises a plurality of branches to share a range of the Doppler frequency portion to be removed in the stage.

6. The method of claim 5, wherein different Doppler frequencies are used in the batches to search a true Doppler frequency of the signal.

7. The method of claim 1, further comprising a step of executing code removal to the digital signal to generate a code-removed signal after the converting step.

8. The method of claim 1, further comprising a step of executing code removal to the digital signal to generate a code-removed signal after the searching step.

9. A correlator comprising:
   an analog-to-digital converter configured to convert a received signal into a digital signal having a first sampling rate;
   a down-sampling unit coupled to the analog-to-digital converter and being configured to receive the digital signal and outputting a down-sampled signal having a second sampling rate; and
   a Doppler frequency searching device coupled to the down-sampling unit and being configured to search Doppler frequency bins for the down-sampled signal.

10. The correlator of claim 9, wherein the down-sampling unit comprises an integration-and-dump unit for integrating a predetermined number of data samples of the signal and dumping the integration results of the data samples into a sample value.

11. The correlator of claim 9, wherein the Doppler frequency searching device comprises a plurality of stages connected in series, each stage has at least one Doppler remover for removing a portion of Doppler frequency of the signal by mixing the signal with a carrier.

12. The correlator of claim 11, wherein the Doppler frequency remover further has an integration-and-dump unit to integrate an output of the Doppler frequency remover and dump out the Doppler frequency removed signal having a third sampling rate.

13. The correlator of claim 11, wherein at least one of the Doppler frequency removers is deactivated when the Doppler frequency range to be searched is small.

14. The correlator of claim 9, further comprising a code removal unit receiving the digital signal to generate a code-removed signal, and sending the code-removed signal to the down-sampling unit to be down-sampled as the down-sampled signal.

15. The correlator of claim 9, further comprising a code removal unit receiving the output from the Doppler frequency searching device to generate a code-removed signal.

16. A method for searching Doppler frequency in a GNSS receiver, comprising steps of:
   converting a received signal into a digital signal having a first sampling rate;
   executing code removal to the digital signal to generate a code-removed signal;
   down-sampling the code-removed signal to output a down-sampled signal having a second sampling rate; and
   searching Doppler frequency bins in a plurality of stages, the Doppler frequency of the signal being divided into portions to be removed in the respective stages.

17. The method of claim 16, wherein sampling rate of the signal is reduced in each stage.

18. The method of claim 16, wherein each stage comprises a plurality of branches to share a range of the Doppler frequency portion to be removed in the stage.

19. The method of claim 18, wherein different Doppler frequencies are used in the batches to search a true Doppler frequency of the signal.

20. A correlator comprising:
   an analog-to-digital converter configured to convert a received signal into a digital signal having a first sampling rate;
   a down-sampling unit coupled to the analog-to-digital converter and being configured to receive the digital signal and output a down-sampled signal having a second sampling rate; and
   a Doppler frequency searching device comprising a plurality of stages connected in series, each stage having at least one Doppler remover configured to remove a portion of Doppler frequency of the signal.

21. The correlator of claim 20, wherein the Doppler frequency remover further comprises an integration-and-dump unit to integrate an output of the Doppler frequency remover and dump out the Doppler frequency removed signal.

22. The correlator of claim 20, wherein the Doppler frequency remover removes the portion of Doppler frequency of the signal by mixing the signal with a carrier.

23. The correlator of claim 20, further comprising a code removal unit for receiving the digital signal to generate a code-removed signal.

24. The correlator of claim 20, further comprising a code removal unit receiving the output from the Doppler frequency searching device to generate a code-removed signal.

* * * * *